United States Patent
Pastor et al.

[19]
[11] Patent Number: 5,941,919
[45] Date of Patent: Aug. 24, 1999

[54] CHASSIS CONTROL SYSTEM

[75] Inventors: Stephen Robert Pastor, Farmington Hills; Ronald Paul, Detroit; Michael Douglas Rizzo, White Lake; Edward John Bedner, Brighton; Vivek Jaikamal; Kevin Austin O'Dea, both of Ann Arbor; Edmund Stanley Browalski, W. Bloomfield; Howard Hans Ludwig, Eastpoint; Scott Douglas Morrison, Rochester; Hsien Heng Chen; Yuen-Kwok Chin, both of Troy; Youssef Ahmed Ghoneim, Macomb Township; William Chin-Woei Lin, Troy; Mutasim Abdurrahman Salman, Rochester Hills; David Michael Sidlosky, Huntington Woods; Michael Paul Turski, Rochester Hills, all of Mich.

[73] Assignee: General Motors Corporation, Detroit, Mich.

[21] Appl. No.: 08/733,054

[22] Filed: Oct. 16, 1996

[51] Int. Cl.$^6$ .............................. B60K 28/16; B60T 8/32
[52] U.S. Cl. ............................... 701/36; 701/72; 303/140
[58] Field of Search .................................. 701/36, 38, 37, 701/41, 72, 71, 70, 80; 180/422, 197, 412; 303/140, 146

[56] References Cited

U.S. PATENT DOCUMENTS

| | | | |
|---|---|---|---|
| 4,998,593 | 3/1991 | Karnopp et al. | 180/408 |
| 5,063,514 | 11/1991 | Headley et al. | 364/426.02 |

(List continued on next page.)

FOREIGN PATENT DOCUMENTS

| | | |
|---|---|---|
| 0 555 860 A1 | 8/1993 | European Pat. Off. . |
| 41 23 235 C1 | 11/1992 | Germany . |

(List continued on next page.)

OTHER PUBLICATIONS

Control of Vehicle Dynamics, Automotive Engineering, May 1995, pp. 87–93.

Consideration of Lateral & Longitudinal Vehicle Stability by Function Enhanced Brake & Stability Control System, SAE #940832, pp. 63–72, Feb. 1994.

Spin Control for Cars, Steven Ashley, Associate Editor, Mechanical Engineering Jun., 1995, pp. 66–68.

May the Cornering Force Be With You; Popular Mechanics; Dec. 1995, pp. 74–77.

Stable As She Goes: Don Sherman, Automotive Industries, May 1995.

The Spin Doctors: Don Sherman, Dec. 1995.

Mercedes/Bosch ESP; Automotive Industries, Apr. 1995.

Controlling Vehicle Stability; Christopher A. Sawyer, Automotive Industries, Jan. 1995.

Let Magic Fingers Do the Driving: Wards Auto World; May 1995.

Technoid: Intelligent Brakes Are on the Way; Car and Driver, Aug. 1994.

Toyota Vehicle Stability Control System; Automotive Engineering, Aug. 1995.

(List continued on next page.)

*Primary Examiner*—Tan Q. Nguyen
*Attorney, Agent, or Firm*—Anthony Luke Simon

[57] ABSTRCT

In a vehicle with a first operating mode in which all vehicle wheels have substantially no lateral movement on a road surface and a second operating mode in which at least some of the vehicle wheels have lateral movement on the road surface, and with an actuator capable of affecting vehicle yaw rate, a vehicle yaw rate control method comprising the steps of: measuring an actual vehicle yaw rate; measuring vehicle steering wheel position; in the second mode of operation, determining a desired yaw rate command linearly responsive to the measured steering wheel position; wherein the actuator is controlled to minimize a difference between the measured vehicle yaw rate and the desired vehicle yaw rate.

2 Claims, 9 Drawing Sheets

U.S. PATENT DOCUMENTS

| | | | |
|---|---|---|---|
| 5,172,961 | 12/1992 | Inoue et al. | 303/100 |
| 5,229,944 | 7/1993 | Yasuno | 303/146 |
| 5,275,475 | 1/1994 | Hartmann et al. | 303/146 |
| 5,313,389 | 5/1994 | Yasui | 701/43 |
| 5,341,297 | 8/1994 | Zomotor et al. | 364/426.03 |
| 5,366,281 | 11/1994 | Littlejohn | 303/3 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,524,079 | 6/1996 | Ishida et al. | 701/42 |
| 5,636,909 | 6/1997 | Hirao et al. | 303/140 |
| 5,700,073 | 12/1997 | Hiwatashi et al. | 303/146 |
| 5,742,917 | 4/1998 | Matsuno | 701/69 |

FOREIGN PATENT DOCUMENTS

| | | |
|---|---|---|
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |
| 43 14 827 A1 | 11/1994 | Germany . |
| 405262213 | 10/1993 | Japan . |
| 406024304 | 2/1994 | Japan . |
| 406087421 | 3/1994 | Japan . |
| 406115418 | 4/1994 | Japan . |
| 406127354 | 5/1994 | Japan . |
| 2 257 551 | 1/1993 | United Kingdom . |
| 2 263 340 | 7/1993 | United Kingdom . |
| 2269571 | 2/1994 | United Kingdom . |
| 2 275 312 | 8/1994 | United Kingdom . |

OTHER PUBLICATIONS

Vehicle Dynamics Offers New Level of Safety: Machine Design, Sep. 1994.

Handling Control Systems for Your Car: Popular Electronics; Feb. 1995.

VDC, The Vehicle Dynamics Control System of Bosch: A. VanZanten, R. Erhardt and G. Pfaff; Robert Bosch GmbH; No. 950759, pp. 9–26, Feb. 1995.

CHASSIS CONTROL SYSTEM

This invention relates to a vehicle chassis control system and method.

BACKGROUND OF THE INVENTION

Automotive vehicles have been produced or demonstrated with brake systems that modulate brake force during stops to provide anti-lock brake control (ABS) and/or that modulate brake force during vehicle acceleration to provide positive acceleration traction control (TCS). Some such brake systems additionally provide brake-by-wire control.

SUMMARY OF THE INVENTION

It is an object of this invention to provide a chassis control method according to claim 1.

Advantageously this invention provides a chassis control system for actively controlling the road response of a motor vehicle.

Advantageously this invention provides a chassis control method and system that provides closed loop yaw control by developing a yaw rate command from operator inputs such as vehicle speed and steering wheel position. This invention provides a control that minimizes a difference between the yaw rate command and the actual vehicle yaw rate.

Advantageously, this invention provides yaw control commands responsive to the operating conditions of the vehicle to provide a desired vehicle response. Typical vehicles have two operating regions, the first a linear operating region in which vehicle yaw rate is substantially linear with respect to vehicle steering wheel position and the second a non-linear operating region in which vehicle yaw rate is substantially non-linear with respect to steering wheel position. Transfer from the linear state to the non-linear state occurs by either increasing vehicle speed in a turn, increasing the steering wheel angle, or both, to the point where one or more vehicle wheels begin lateral movement on the road surface. According to this invention, a yaw rate command interpreter is provided in a yaw rate control system that maintains the linear relationship between yaw rate and vehicle steering wheel position in the linear operating region of the vehicle and changes the vehicle operation in the non-linear operating region so that commanded vehicle yaw rate is linear with relation to steering wheel angle.

Advantageously, the yaw rate control system applies the command generated by the command interpreter to a chassis system to affect yaw rate of the vehicle. The chassis system may be an active brake control system, a suspension control system, a combination thereof, or any other system that can affect vehicle yaw rate.

Advantageously, according to a preferred example, this invention provides a vehicle yaw rate control method for use in a vehicle with a first operating mode in which all vehicle wheels have substantially no lateral movement on a road surface and a second operating mode in which at least some of the vehicle wheels have lateral movement on the road surface, and with an actuator capable of affecting vehicle yaw rate, the vehicle yaw rate control method comprising the steps of: measuring an actual vehicle yaw rate; measuring vehicle steering wheel position; in the second mode of operation, determining a desired yaw rate command linearly responsive to the measured steering wheel position; wherein the actuator is controlled to minimize a difference between the measured vehicle yaw rate and the desired vehicle yaw rate.

BRIEF DESCRIPTION OF THE DRAWINGS

The present invention will now be described by way of example with reference to the following drawings, in which.

DETAILED DESCRIPTION OF THE INVENTION

Figure 1:
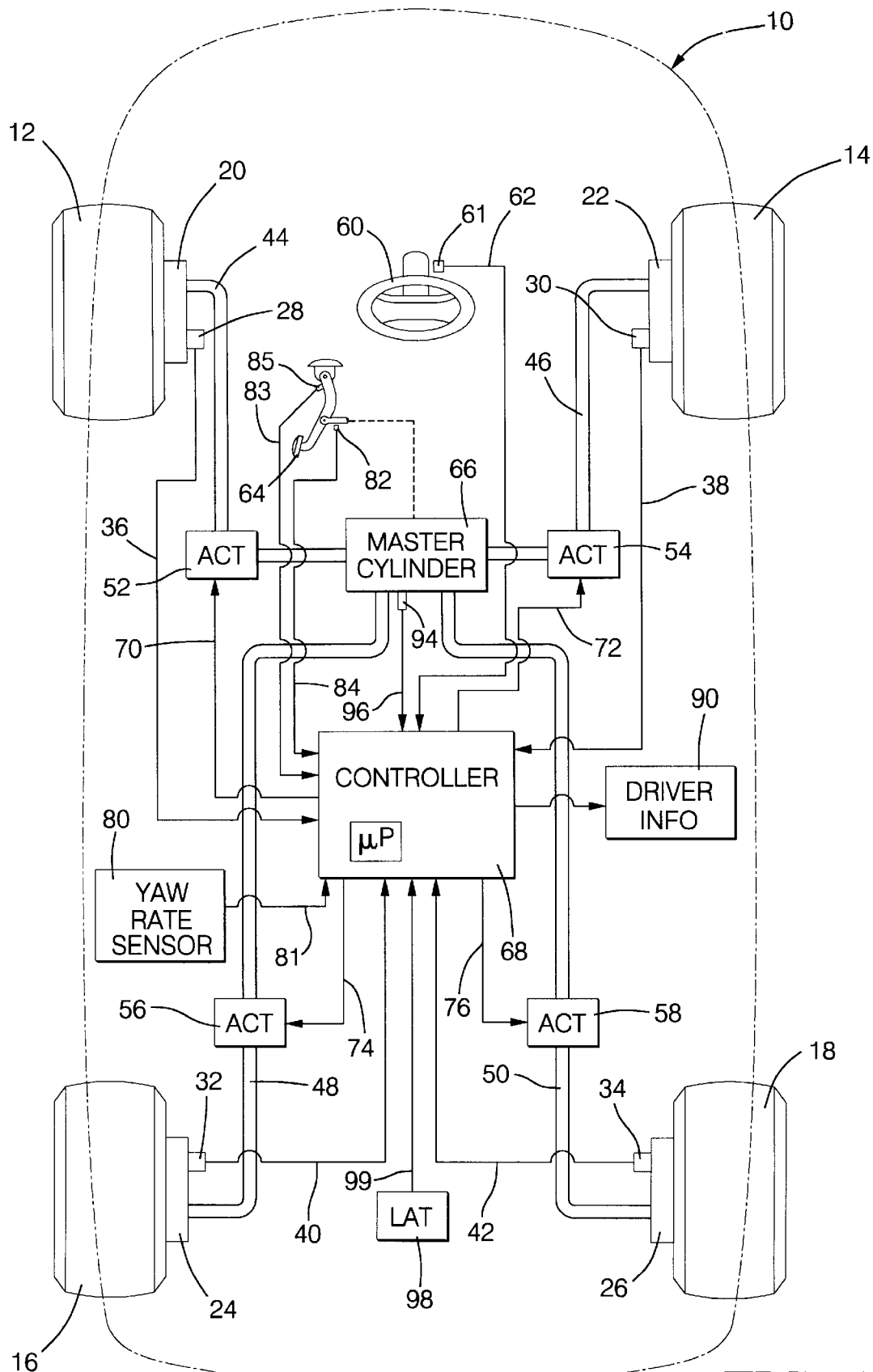
FIG. 1 is an example schematic of a vehicle brake control system according to this invention.

Referring to FIG. 1, the vehicle 10 shown includes a controllable brake system with controller 68 for controlling the brakes 20, 22, 24 and 26 for wheels 12, 14, 16 and 18, respectively. Various inputs to the controller 68 include the wheel speed signals on lines 36, 38, 40 and 42 from wheel speed sensors 28, 30, 32 and 34, the brake pedal switch signal on line 84 from brake pedal switch 82, the brake pedal extended travel signal on line 83 from pedal travel sensor 85 (optional), the steering wheel angle signal on line 62 from sensor 61 indicating the angle of steering wheel 60, the yaw rate signal on line 81 from yaw rate sensor 80, the master cylinder pressure signal on line 96 from master cylinder pressure sensor 94 (optional) and the lateral acceleration signal on line 99 from lateral accelerometer 98.

Each of the sensors 28, 30, 32, 34, 61, 80, 82, 85, 98 and 99 is implemented in a manner known to those skilled in the art. The brake pedal travel sensor 85 is a switch mounted to the pedal that provides an output signal when the pedal has been depressed an extended amount indicating "hard" braking by the driver.

In one example, the steering wheel position sensor 61 may be a digital sensor that provides output signals that increment a digital position signal within controller 68 with each degree or partial degree of movement of the steering wheel 60 in one direction and decrement the digital position signal with each degree or partial degree of movement in the opposite direction. The steering wheel sensor 61 may also include an analog sensor position output (i.e., from a rotary resistive device of a known type) that provides approximate steering wheel position information. The analog output can be used, for example, to determine whether the steering wheel is turned less than a preset limit, i.e., 90 degrees, at vehicle start-up. A method for determining the center position of the steering wheel position sensor is disclosed in pending U.S. patent application, Ser. No. 08/664,321, assigned to the assignee of this invention.

Responsive to the various inputs, the controller controls the braking of each wheel in anti-lock braking mode during certain braking maneuvers and in traction control mode during certain vehicle acceleration maneuvers to maintain tractive force of the drive wheels on the road surface. The anti-lock brake control and positive acceleration traction control are performed in a known manner except as modified herein.

The controller 68 also actively controls the wheel brakes 20, 22, 24 and 26 responsive to the actual vehicle yaw rate as measured by yaw rate sensor 80 to minimize the difference between the actual vehicle yaw rate and a desired vehicle yaw rate. Because the base braking, antilock braking and traction control functions are known to those skilled in the art, only a general description thereof will be set forth herein.

When the vehicle is in a braking maneuver, the controller monitors the wheel speed signals from sensors 28, 30, 32 and 34 and determines if one or more of the wheels is in or is about to be in an incipient lock-up condition, in which case anti-lock brake control mode for the one or more wheels is activated. In the anti-lock brake control mode, the controller 68 determines and outputs commands to the actuators 52, 54, 56 and 58 corresponding to the wheels in anti-lock brake mode to modulate brake force to the wheels. Through control of the actuators 52, 54, 56 and 58, the controller prevents the wheels from entering a lock-up condition while achieving effective brake control and steerability in a manner known to those skilled in the art of anti-lock brake control.

When the vehicle is not in a braking maneuver, but is accelerating due to output motive force from the vehicle prime mover, i.e., the internal combustion engine or electric motor, the controller 68 monitors the wheel speeds sensed by sensors 28, 30, 32 and 34 to determine if the wheels transferring motive force to the road surface are slipping or are about to slip. In such wheel conditions, the controller 68 sends commands to the actuators 52–58 corresponding to the wheels that are slipping or are about to slip to provide brake force to the wheels to reduce the slip. Such control is typically performed in conjunction with a parallel control in the engine or motor controller to temporarily reduce the motive force output until wheel-to-road traction is reestablished.

In one example, the brake actuators 52–58 are implemented as reciprocating piston actuators of a type known to those skilled in the art. Such actuators typically include a dc motor positionally controlling a reciprocating piston through a rotary-to-linear motion converter to increase and/or decrease hydraulic pressure in the wheel brakes. In another example, brake actuators 52–58 are implemented as solenoid valves for selectively coupling brakes 20–26 to a source of pressurized hydraulic fluid to increase brake pressure and for selectively coupling brakes 20–26 to a brake fluid reservoir to decrease brake pressure. Implementation of such solenoid valves is known to those skilled in the art. In yet another example, the rear brakes and/or the front brakes may be electric motor-driven brakes, in which case the actuator and brake functions are performed by the same unit. An example of a brake system including front hydraulic brakes and rear electric brakes in which all four brakes are drive-by-wire is set forth in U.S. Pat. No. 5,366,291, assigned to the assignee of this invention.

This invention performs an active brake control of the four wheel brakes 20–26 responsive to the steering wheel angle signal on line 62, the yaw rate signal on line 81, the vehicle speed as calculated responsive to the signals from the four wheel speed sensors and the lateral acceleration signal on line 99. Using these signals, controller 68 determines a desired vehicle yaw rate and compares that desired yaw rate to the actual yaw rate sensed by sensor 80. If the actual yaw rate of the vehicle differs from the desired yaw rate by more than a threshold that is dynamically determined, controller 68 determines and outputs commands to actuators 52, 54, 56 and 58 to control the vehicle wheel brakes 20, 22, 24 and 26 to bring the vehicle yaw rate into conformance with the desired yaw rate.

In carrying out these tasks, controller 68 typically includes a microprocessor, ROM and RAM and appropriate input and output circuits of a known type for receiving the various input signals and for outputting the various control commands to the actuators 52, 54, 56 and 58.

Figure 2:
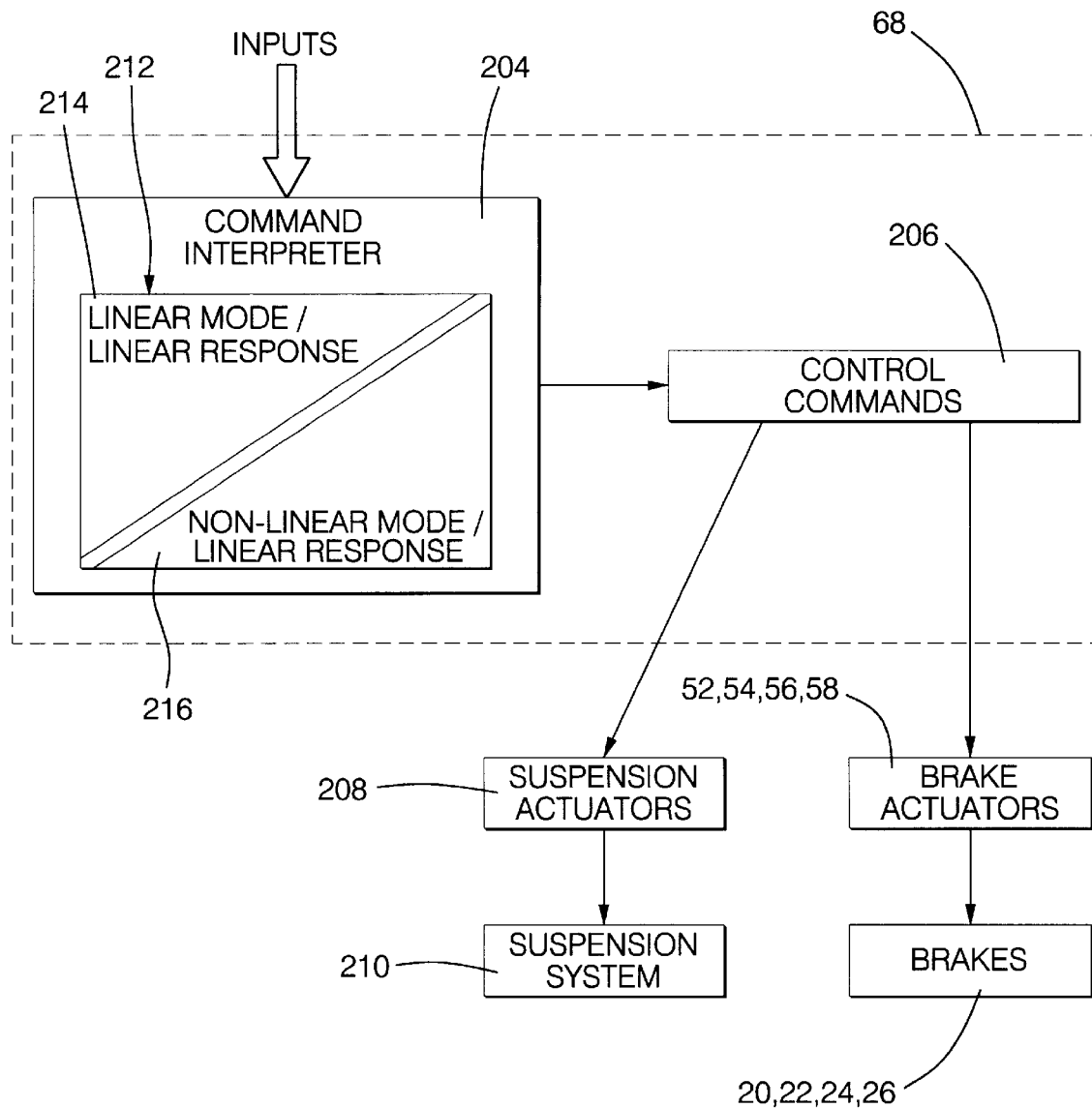
FIG. 2 illustrates an example control structure according to this invention.
Figure 6:
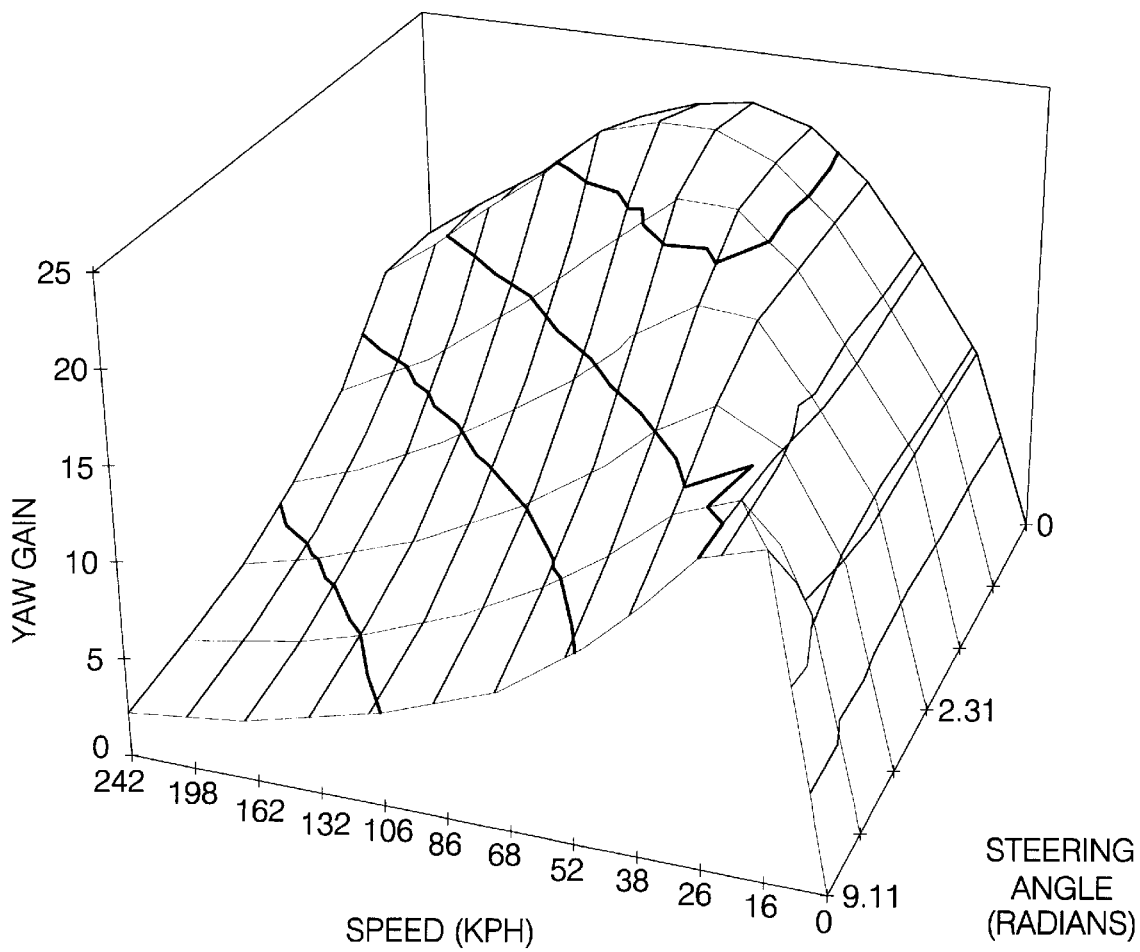
Figure 7:
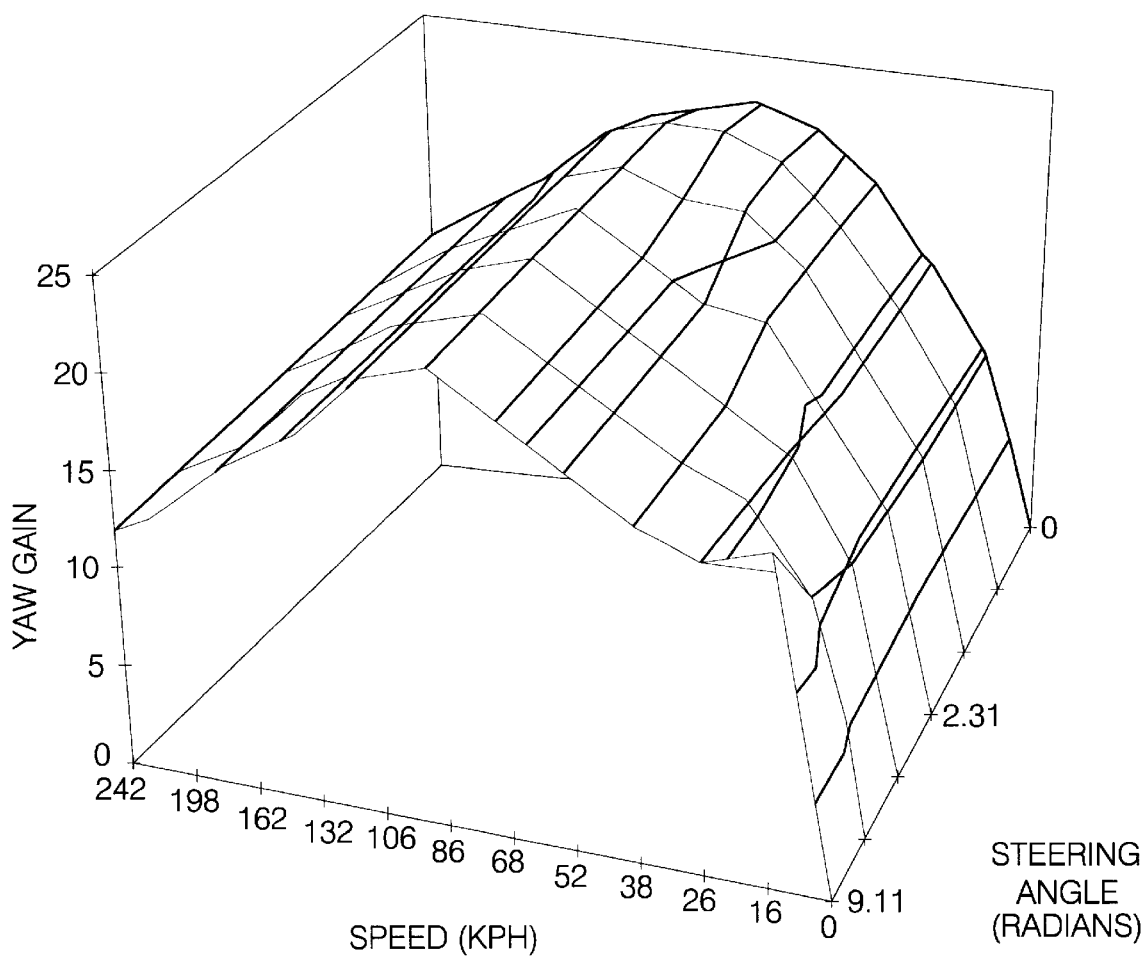

Referring now to FIG. 2, the example control structure shown includes command interpreter 204 receiving the various system inputs from the various vehicle sensors such as shown in FIG. 1. The command interpreter 204 develops desired yaw rate commands responsive to the various system inputs and the data structure 212 (described in more detail below with reference to FIGS. 6 and 7) stored in non-volatile memory of controller 68. The data structure 212 has a data subset 214 corresponding to vehicle operation in linear mode and a data subset 216 corresponding to vehicle operation in non-linear mode.

When the vehicle operation is in the linear mode, the command interpreter 204, using data structure subset 214, provides commands to the control block 206 designed to maintain the linear response of the vehicle. For example, when the control according to this invention is used to control wheel brakes to affect vehicle yaw control, the commands provided by block 204 do not modify the wheel brake operation while the vehicle is in the linear mode. When the control according to this invention is used to control a vehicle variable force suspension system, the suspension control is provided to maintain the current driving conditions, and not to induce a change in understeer or oversteer.

When the vehicle operation is in the non-linear region, the command interpreter 204, using data structure subset 216, provides commands to the control block 206 commanding a yaw rate linearly responsive to the vehicle steering wheel input. Block 206 uses the command generated at block 204 to control one or more vehicle chassis systems, such as controllable suspension actuators, represented by block 208, or controllable brake actuators, represented by the block referenced 52, 54, 56, 58, to control the vehicle suspension system 210 and/or brakes 20–26 to bring the actual vehicle yaw into a linear relationship with vehicle steering wheel angle. This control thus maintains the yaw response of the vehicle linear with respect to the steering wheel input even when the vehicle is operating in its nonlinear performance region. Example controllable suspension system actuators are set forth in U.S. Pat. No. 5,282,645.

Figure 3:
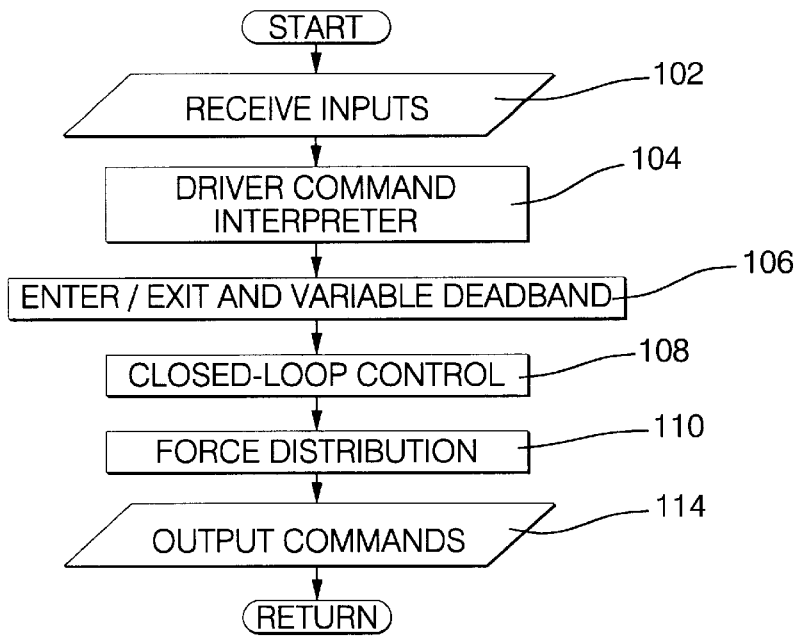
FIG. 3 illustrates an example master flow diagram for example operation of controller 68 in FIG. 1.

Referring now to FIG. 3, an example master flow diagram for control by the controller 68 is shown. The control starts and moves to block 102 where the controller receives the various inputs from the various sensors illustrated in FIG. 1. From block 102, the routine moves to block 104 where a subroutine is implemented to convert the sensor information received at block 102 into a desired yaw rate command, $\gamma_D$. In an example providing advantageously flexible control, block 104 determines two parallel desired yaw rate commands, and understeer command, $\gamma_{DU}$, and an oversteer command, $\gamma_{DO}$. The parallel running commands, $\gamma_{DU}$ and $\gamma_{DO}$, are each maintained according to their own independent criteria allowing independent calibration of oversteer and understeer modes. The control can then switch between the understeer and oversteer yaw rate commands, $\gamma_{DU}$ and $\gamma_{DO}$, as the vehicle switches between understeer and oversteer modes. The steps performed at block 104 are described in further detail with reference to FIGS. 4–15.

From block 104, the routine continues to block 106 where a variable dead band control is implemented. In general, the variable dead band control at block 106 determines, responsive to the various sensor signals received at block 102, whether the vehicle is in understeer or in oversteer mode. Block 106 also determines a yaw rate dead band, DB, which varies with the vehicle conditions as represented by the sensor signals and which may vary depending upon whether the vehicle is in understeer or oversteer mode.

The variable dead band control block 106 then determines whether actual vehicle yaw rate, $\gamma_M$, as measured by the yaw rate sensor 80, varies from the desired vehicle yaw rate as determined at block 104 by an amount greater than the dead band. If the difference between the actual yaw rate and the desired yaw rate is less than the dead band amount and the ABC flag is reset, indicating that active brake control is not active, then the ABC flag is maintained reset and active brake control is not performed at blocks 108–114. However, if the difference between the actual yaw rate, $\gamma_M$, and the desired yaw rate, $\gamma_D$, (also referred to as yaw rate error, $\Delta\gamma_E$) is greater than the dead band as determined by block 106, and if other criteria explained below are met, then the ABC flag is set to active, setting the active brake control active. If the ABC flag is active and the yaw rate error, $\Delta\gamma_E$, is less than an exit dead band, then an exit strategy from the active brake control is commenced and if the yaw rate error continues to be below the exit dead band throughout the exit procedure, then the ABC flag is reset, terminating active brake control until the yaw rate error again rises above the dead band.

Example steps for performing the function of block 106 are described in detail in pending U.S. patent application, Attorney Docket No. H-198194, assigned to the assignee of this invention and having a disclosure that is incorporated herein by reference. Because the details of block 106 are not central to this invention, they will not be reproduced herein in detail.

From block 106, the routine continues to block 108 where a closed loop yaw rate control subroutine is implemented to provide yaw rate control commands responsive to the yaw rate error, $\Delta\gamma_E$, determined at block 106. The control at block 108 provides a dual command structure and uses preferably a PD or PID control for each of the dual structures.

More particularly, the dual structure addresses yaw rate error using both a front/rear control and a left/right control. The front/rear control recognizes that when front wheels or rear wheels undergo slip, the lateral force control provided by the wheels is reduced. By reducing the amount of slip experienced by the front or rear wheels, the lateral wheel-to-road force is increased. Thus, where appropriate, the front-to-rear control commands reduced slip at either the front axle or the rear axle to increase lateral force between either the front wheels and the road or the rear wheels and the road allowing the improved tractive force to reduce the YAW rate error.

In the second arm of the dual control structure, a left/right control operates on one or more of the four vehicle wheels independent of the front/rear command. The left/right command is designed to add a torque moment to the vehicle counter to the direction of yaw rate error, $\Delta\gamma_E$, to return the vehicle to the desired yaw rate, $\gamma_{DO}$ or $\gamma_{DU}$. This is achieved by either increasing brake pressure on one wheel, decreasing brake pressure on one wheel, or increasing brake pressure on one wheel and decreasing brake pressure on another wheel. The modification to the brake pressure(s) create the desired torque moment in the vehicle body to achieve the desired yaw control.

In a preferred example, this invention is implemented using closed loop wheel speed control and thus the front/rear command, $\Delta V_{FR}$, and the left/right command, $\Delta V_{LR}$, are determined as wheel delta velocity commands, that is, $\Delta V_{FR}$ and $\Delta V_{LR}$ command wheel speeds to be applied to certain of the vehicle wheels commanding those wheels to have a speed different from the reference speed of the wheels.

Example steps for performing the function of block 108 are described in detail in pending U.S. patent application, Attorney Docket No. H-198194, assigned to the assignee of this invention and having a disclosure that is incorporated herein by reference. Because the details of block 108 are not central to this invention, they will not be reproduced herein in detail.

At block 110, the controller performs a force distribution control which applies the commands $\Delta V_{FR}$ and $\Delta V_{LR}$ to the vehicle wheels. In general, the force distribution control at block 110 operates as follows. If the vehicle is in an anti-lock braking mode in which the vehicle brakes are controlled by driver commanded braking to prevent wheel lock up, the left/right command is applied to only one of the four vehicle wheels to command a release of brake pressure at the vehicle wheel, introducing the desired torque moment in the vehicle body by the left-to-right brake difference resulting from the commanded release.

If the vehicle is in a positive acceleration traction control mode in which a spin or speed difference between actual and reference wheel speeds is controlled to a target value to keep the driven wheels from spinning loose, then the left/right control command is applied to only one of the four vehicle wheels to apply brake pressure to that wheel. The brake pressure applied to the one wheel creates a left-to-right brake difference creating a torque moment on the vehicle body to reduce the YAW rate error. If the vehicle is not in anti-lock braking mode or positive acceleration traction control mode, then the left/right yaw control command is applied to two of the four vehicle wheels releasing brake pressure in one of the wheels and applying brake pressure to the other. The resulting difference between the left and right brake forces creates a torque moment on the vehicle body that minimizes the yaw rate error.

Block 110 also interacts the front/rear control with the anti-lock brake and positive acceleration traction controls. When the anti-lock brake control is active, $\Delta V_{FR}$ is applied by modifying the amount of braking to one of the axles, i.e., the rear axle, reducing the average brake pressure to that axle, increasing that axle's holding force on the road surface. During positive acceleration traction control, the front/rear command, $\Delta V_{FR}$, is applied by reducing the target wheel spin. This has the effect of reducing the average wheel spin during acceleration, increasing the lateral holding force of the drive wheels.

Example steps for performing the function of block 110 are described in detail in pending U.S. patent application, Attorney Docket No. H-198194, assigned to the assignee of this invention and having a disclosure that is incorporated herein by reference. Because the details of block 110 are not central to this invention, they will not be reproduced herein in detail.

From block 110 the routine continues to block 114 where the brake control commands are output, transferring the brake control commands as modified by the closed loop yaw control provided herein to the vehicle wheel brakes to achieve the desired yaw rate control.

In an example implementation, the brake control commands control the brake fluid apply and release rates for the wheels under control. A positive control term commands an apply of brake fluid to the wheel brake, a negative control term commands a release of brake fluid from the wheel brake and a control term equal to zero maintains the brake pressure at its current level. Application of the control terms to affect the desired apply and release rates is well known to those skilled in the art of anti-lock brake control and/or positive acceleration traction control.

Referring now to FIGS. 4–15, example steps performed by the controller in carrying out the driver command interpreter, block 104 of FIG. 3, are now described in more detail.

Figure 4:
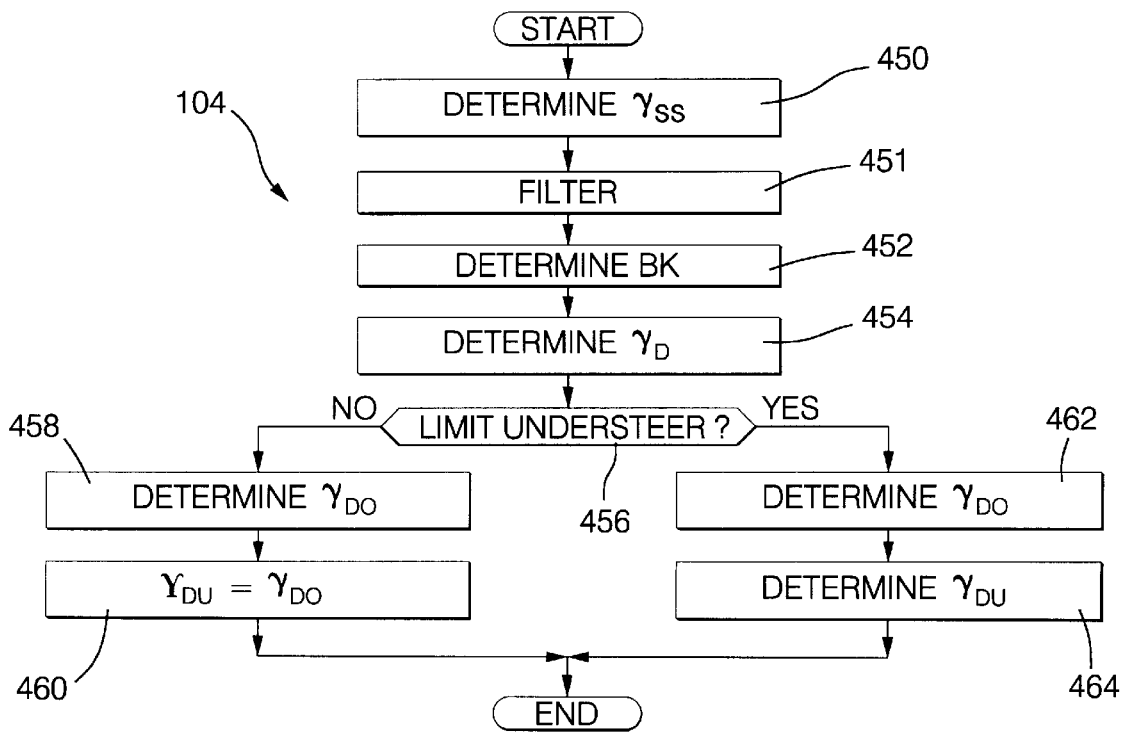
FIGS. 4–15 illustrate flow control routines for implementation of example control functions according to this invention.

FIG. 4 illustrates a main subroutine performed by the driver command interpreter. At block 450, the routine determines a desired steady state yaw rate command, $\gamma_{SS}$, as described below with reference to FIG. 5. Block 451 filters the command $\gamma_{SS}$ and then block 452 determines a bank angle compensation term, BK, as described below with reference to FIG. 8. At block 454 the routine determines the desired yaw rate, $\gamma_D$, as the sum of $\gamma_{SS}$ and BK.

Block 456 is shown as a decision block to illustrate two possible implementations of this invention. In one example implementation, as shown by blocks 458 and 460, the control routine retains as much command authority during understeer as it retains during oversteer whereas in the example shown by blocks 462 and 464, the understeer authority is limited to temper the system's response to occurrence of understeer. The decision to use blocks 458 and 460 or blocks 462 and 464 can be preprogrammed as a preset variable for a particular car line.

In the example where understeer authority is not limited differently than oversteer authority, the routine moves to block 458 where it determines the oversteer desired yaw rate command, $\gamma_{DO}$, as described below with reference to FIG. 10 then moves to block 460 where it sets the understeer desired yaw rate command, $\gamma_{DU}$, equal to the oversteer desired YAW rate command. If the understeer desired yaw rate command is to be limited, block 462 determines $\gamma_{DO}$ as described below with reference to FIG. 10 and then block 464 determines $\gamma_{DU}$ as described below with reference to FIG. 13.

As will be described in more detail below, the over and understeer yaw rate commands, $\gamma_{DO}$ and $\gamma_{DU}$, are continuously updated with each control loop of the control routine and each depends both on $\gamma_D$ and on previous values of $\gamma_{DU}$ or $\gamma_{DO}$, whichever is appropriate. This invention provides the advantage of continuously updating both the understeer and oversteer yaw rate commands allowing easy switching between understeer and oversteer yaw rate control if the vehicle quickly switches between understeer and oversteer states.

Figure 5:
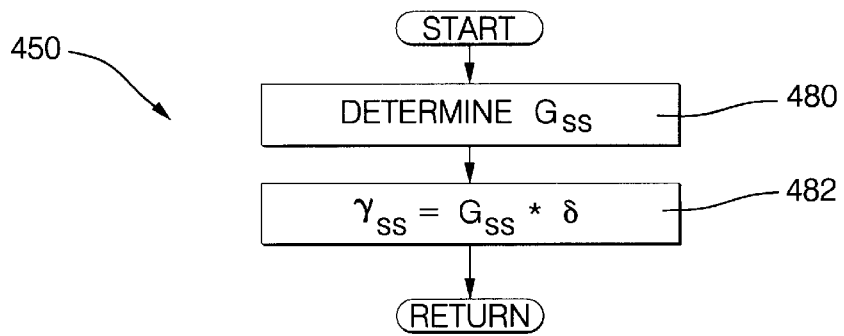

Referring now to FIG. 5, the subroutine for determining the steady state desired yaw rate, $\gamma_D$, is shown. At block 480 a steady state yaw gain, $G_{SS}$, is determined as the output of a look-up table whose inputs are vehicle speed, $V_S$, and steering wheel angle, $\delta$. Preferably, the look-up table flexibility adds an advantageous characteristic of the steady state yaw gain by maintaining the gain substantially linear with respect to steering wheel angle when the vehicle is in both linear and nonlinear driving modes. This can be better understood with reference to the following two tables (plotted in FIGS. 6 and 7).

TABLE 1

| $V_S$(KPH)\$\delta$(°) | 0 | 29.7 | 76.5 | 131 | 221 | 352 | 520 |
|---|---|---|---|---|---|---|---|
| 0 | 0 | 0 | 0 | 0 | 0 | 0 | 0 |
| 16 | 9.6 | 9.6 | 9.4 | 9.4 | 9.8 | 11.2 | 16.8 |
| 26 | 14.4 | 14.4 | 14.2 | 14.4 | 15.2 | 15.6 | 15.8 |
| 38 | 18.6 | 18.6 | 18.8 | 18.6 | 17 | 14.4 | 12.2 |
| 52 | 21.2 | 21.6 | 21.4 | 19 | 15 | 11.6 | 9.4 |
| 68 | 22.2 | 23 | 21.6 | 16.8 | 12.2 | 9.4 | 7.2 |
| 86 | 21.6 | 23 | 19 | 14 | 10.2 | 7.6 | 5.8 |
| 106 | 20.6 | 22 | 16.2 | 11.8 | 8.4 | 6.2 | 4.8 |
| 132 | 18.4 | 19.4 | 13.8 | 9.8 | 6.8 | 5 | 3.8 |
| 162 | 16.2 | 17 | 11.4 | 8 | 6.5 | 4 | 3.2 |
| 198 | 14.2 | 14.4 | 9.6 | 6.6 | 4.6 | 3.4 | 2.6 |
| 242 | 12 | 12.2 | 7.8 | 5.4 | 3.8 | 2.8 | 2.2 |

TABLE 2

| $V_S$(KPH)\$\delta$(°) | 0 | 29.7 | 76.5 | 131 | 221 | 352 | 520 |
|---|---|---|---|---|---|---|---|
| 0 | 0 | 0 | 0 | 0 | 0 | 0 | 0 |
| 16 | 9.6 | 9.6 | 9.4 | 9.4 | 9.8 | 11.2 | 16.8 |
| 26 | 14.4 | 14.4 | 14.2 | 14.4 | 15.2 | 15.6 | 15.8 |
| 38 | 18.6 | 18.6 | 18.8 | 18.6 | 17 | 17 | 17 |
| 52 | 21.2 | 21.6 | 21.4 | 19 | 19 | 19 | 19 |
| 68 | 22.2 | 23 | 21.6 | 21 | 21 | 21 | 21 |
| 86 | 21.6 | 23 | 23 | 23 | 23 | 23 | 23 |
| 106 | 20.6 | 22 | 22 | 22 | 22 | 22 | 22 |
| 132 | 18.4 | 19.4 | 19 | 19 | 19 | 19 | 19 |
| 162 | 16.2 | 17 | 17 | 17 | 17 | 17 | 17 |
| 198 | 14.2 | 14 | 14 | 14 | 14 | 14 | 14 |
| 242 | 12 | 12 | 12 | 12 | 12 | 12 | 12 |

Table 1 illustrates an example yaw gain of a typical vehicle in response to vehicle speed and steering wheel angle. As can be seen, for low steering wheel angles and at low vehicle speeds, the gain is substantially constant. As steering wheel angle increases past a certain point, or as vehicle speed increases past a certain point, the yaw gain becomes nonlinear (see the portions of table 1 in italics), decreasing as steering wheel angle increases and/or vehicle speed increases. The look-up table function used according to this invention is shown with respect to Table 2, which illustrates by the italicized numerals that even when the vehicle is in the nonlinear operating region, the yaw gain is maintained constant with respect to steering wheel angle. Since the yaw gain affects the desired yaw rate, $\gamma_D$, to which the vehicle is controlled, the system thereby provides a linear response to operator steering wheel inputs even when the vehicle is in a nonlinear operating condition, i.e., even when one or more sets of tires is experiencing lateral movement over the road surface.

From block 480, the routine continues to block 482 where the desired steady state yaw rate, $\gamma_{SS}$, is set equal to $G_{SS}$ multiplied by $\delta$. After block 482, the subroutine at block 450 is completed.

Figure 14:
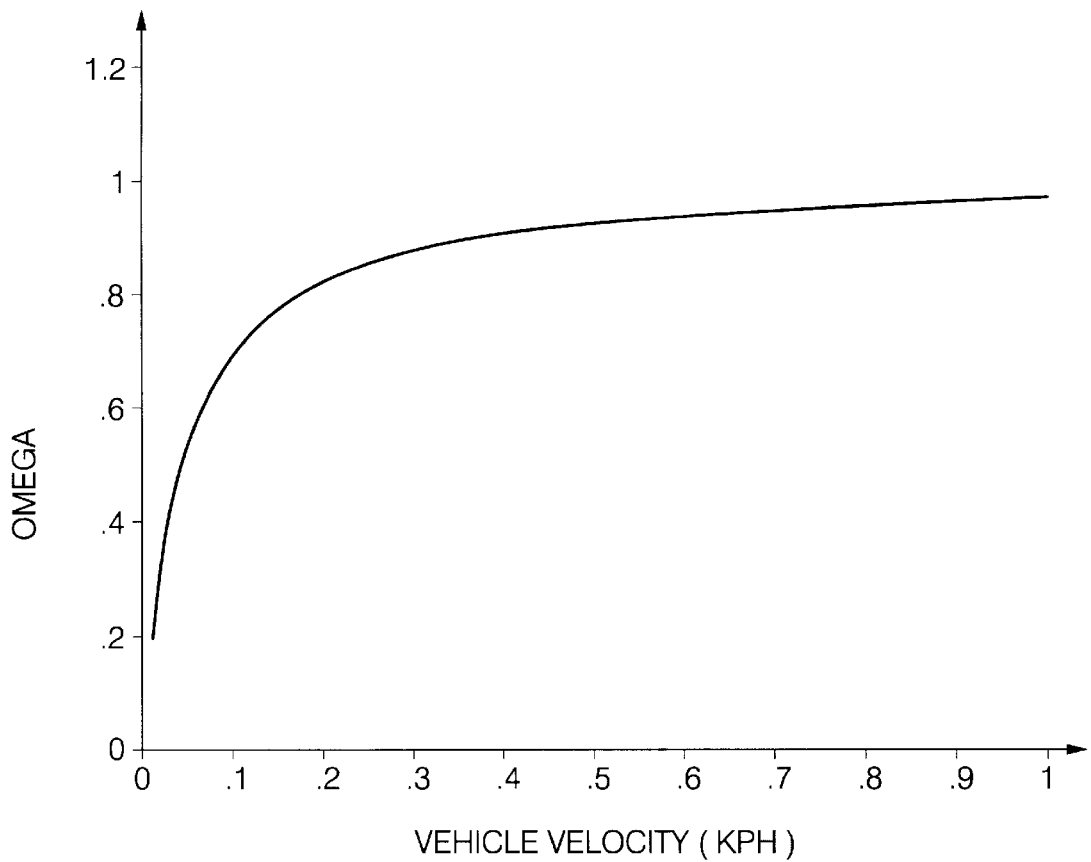
Figure 15:
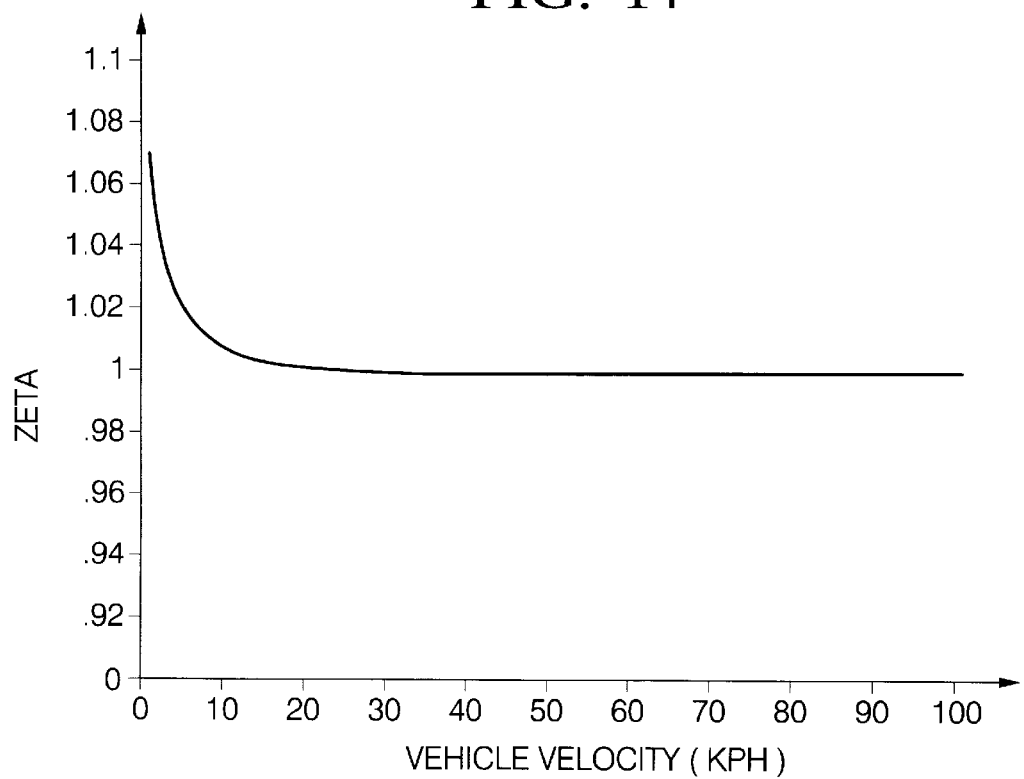

Referring again to FIG. 4, the filter at block 451 is implemented, for example, as a second order filter by first determining a set of coefficients, $\omega$ and $\zeta$, from look-up tables as a function of vehicle speed. Example look-up table functions for the coefficients $\omega$ and $\zeta$ are shown in FIGS. 14 and 15. The desired steady state yaw rate, $\gamma_{SS}$, is filtered using the filter coefficients determined at block 451 according to the equation:

$$y(n)=2*\zeta*\omega*y(n-1)-\omega^2*y(n-2)+K1*x(n),$$

where x(n) is the input to the filter, which is $\gamma_{SS}$, y(n) is the filter output, $\gamma_{SSF}$, and K1 is determined according to:

$$K1=1-2*\omega*\zeta+\omega^2.$$

Figure 8:
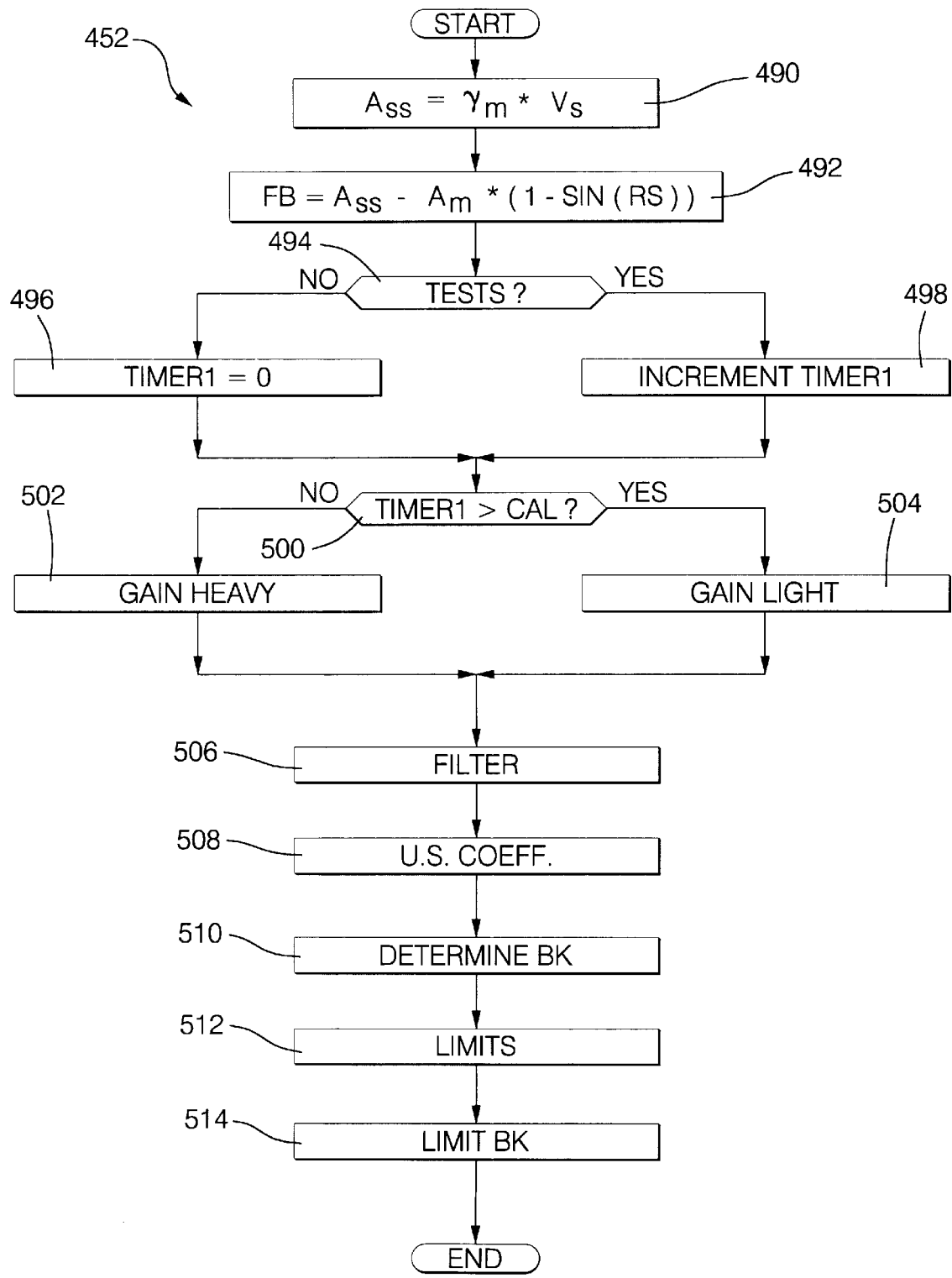

Referring now to FIG. 8, the subroutine executed by block 452 in FIG. 4 begins at block 490 where it computes a value of steady state lateral acceleration, $A_{SS}$, by multiplying the measured yaw rate, $\gamma_M$, by vehicle speed, $V_S$. Then, at block 492, the routine determines a feedback value, FB, representing a difference between $A_{SS}$ and lateral acceleration as measured by the lateral accelerometer, $A_M$, taking into account the roll stiffness of the vehicle:

$$FB=A_{SS}-A_M*(1-SIN(RS)),$$

where RS is a predetermined constant representing the roll stiffness of the vehicle, having an example value of 6 degrees/g.

At block 494, the routine checks whether the ABC flag is reset, whether the absolute value of yaw rate error, $A\gamma_E$, as determined by the closed loop control block 108 (FIG. 3) is less than a predetermined value, for example, 4 degrees/s, whether the absolute value of the steering rate $(d\delta/dt=(\delta(n)-\delta(n-1))/0.01)$, which is the differentiated value of the steering wheel position signal) is less than a predetermined constant, for example, 80 degrees/s, and whether the absolute value of $\gamma_M$ is less than a predetermined constant, for example 60 degrees/s. If the four tests are true at block 494, the routine continues to block 498 where a value TIMER1 is incremented. Otherwise the routine continues to block 496 where TIMER1 is reset to zero.

From block 496 or 498, the routine continues to block 500 where it compares TIMER1 to a predetermined constant, for example, 0.5 s. A condition of TIMER1 over 0.5 seconds indicates that the vehicle is in a steady state yaw maneuver as opposed to a dynamic maneuver. If TIMER1 is not greater than the predetermined constant, the routine continues to block 502 where it sets a feedback filter gain, $G_{FB}$, equal to a first value representing heavy filtering. Otherwise the routine continues to block 504 where it sets $G_{FB}$ equal to a second value representing light filtering. $G_{FB}$ is then used at block 506 to filter the value FB according to the equation:

$$y(n)=A^*x(n)+(1-A)^*y(n-1),$$

where y(n) is the filter output x(n) is the filter input and A is the filter gain, i.e., 0.04, assuming a 0.01 s control loop time.

Figure 9:
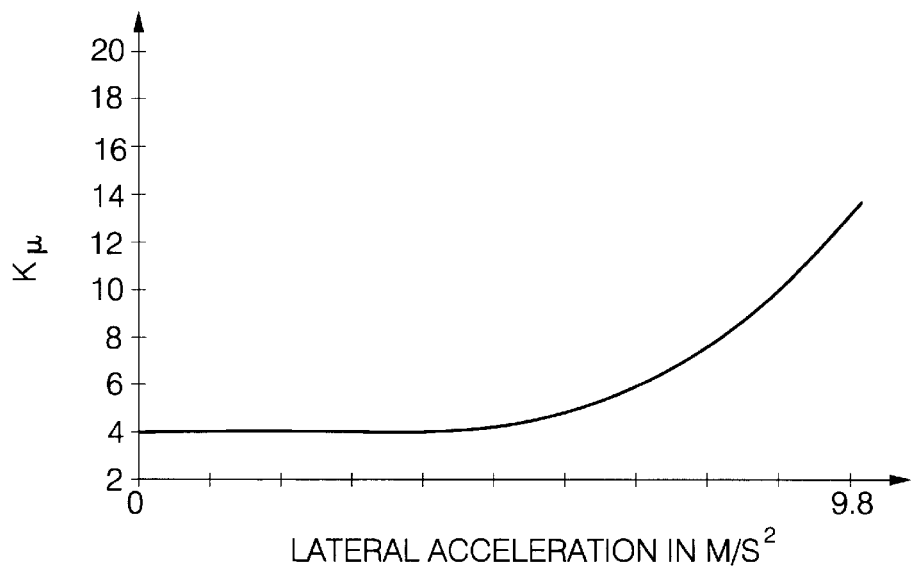

From block 506 the routine continues to block 508 where the understeer coefficient $K_U$ is determined from a look-up table responsive to $A_{SS}$. An example function of the look-up table is shown in FIG. 9 illustrating that the understeer coefficient $K_U$ is generally constant for low vehicle accelerations and then increases once the vehicle lateral acceleration rises above 0.4 g.

At block 510 a bank angle compensation term, BK, is computed according to the equation:

$$BK=FB^*K_U^*V_S/(L+K_U^*V_S^2),$$

where L represents the wheel base of the vehicle. Block 512 sets the bank angle compensation upper and lower limits to plus or minus a predetermined value, for example 4 degrees/s, and then block 514 limits BK to the upper and lower bank angle compensation limits. After block 514, the subroutine 452 for determining the bank angle compensation is completed.

Figure 10:
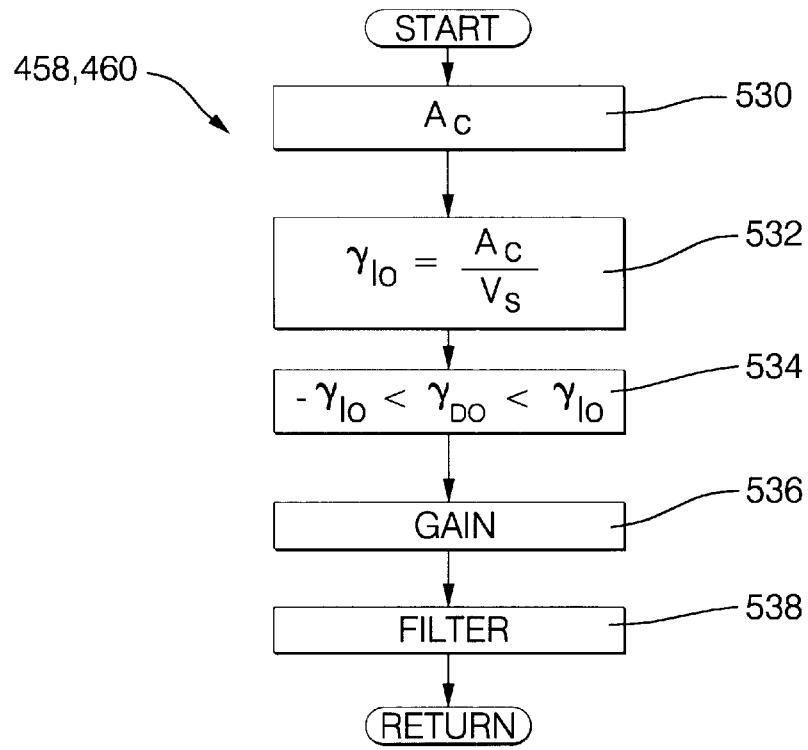

Referring now to FIG. 10, the steps performed by the subroutines 458 and 462 for determining $\gamma_{DO}$ are shown. At block 530 the routine sets $A_C$, representing maximum commanded lateral acceleration, equal to a predetermined value, for example 1.0 g. At block 532, the routine sets the value oversteer desired yaw rate limit, $\gamma_{LO}$, according to the equation:

$$\gamma_{LO}=A_C/V_S.$$

At block 534, the oversteer desired yaw rate, $\gamma_{DO}$, is set equal to $\gamma_D$ if $\gamma_D$ is within $\pm\gamma_{LO}$, equal to $-\gamma_{LO}$ if $\gamma_D$ is less than $-\gamma_{LO}$ and equal to $+\gamma_{LO}$ if $\gamma_D$ is greater than $+\gamma_{LO}$.

Figure 11:
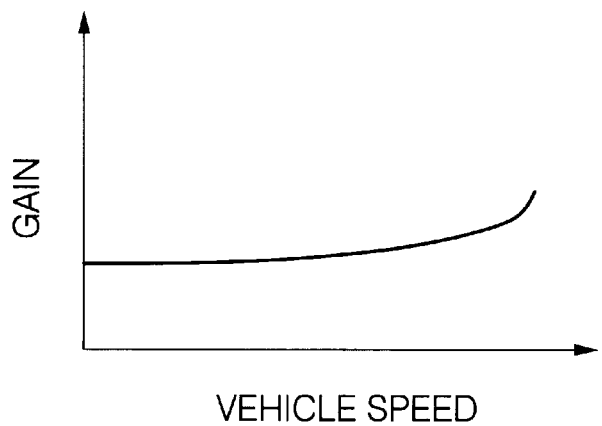

Next block 536 retrieves a filter gain from a look-up table responsive to vehicle speed. The look-up table function is shown in FIG. 11. Block 538 uses the retrieved gain in a first order lag filter to filter $\gamma_{DO}$ to determine $\gamma_{DOF}$ using a filter similar to that described above with reference to block 506.

Figure 12:
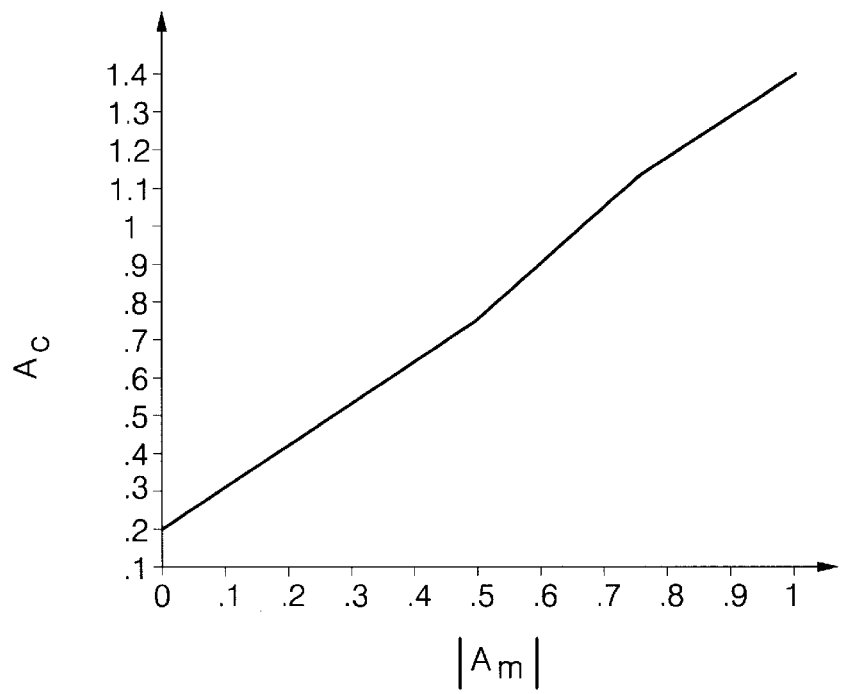
Figure 13:
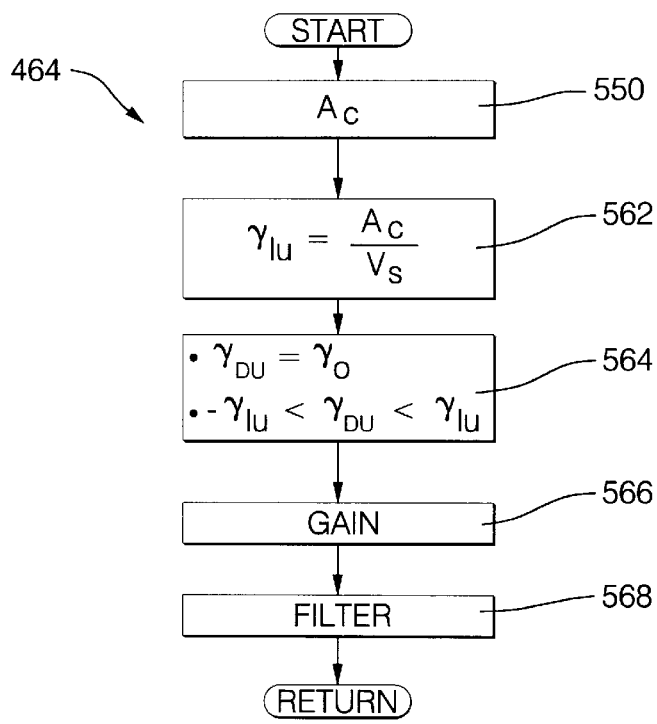

Referring now to FIG. 13, the steps of block 464 (FIG. 4) for determining the understeer desired yaw rate, $\gamma_{DU}$, are shown. At block 550, $A_C$ is determined from a look-up table as a function of the measured lateral acceleration, A. An example look-up table function is illustrated in FIG. 12. The table function allows tailoring of $A_C$ responsive to vehicle speed and builds in upper and lower limits to allow a distinct understeer response. For example, $A_C$ is set to allow some understeer to give the driver a more natural feel to the vehicle. Then at block 562, the understeer desired yaw rate limit, $\gamma_{LU}$, is determined as:

$$\gamma_{LU}=A_C/V_S.$$

Then at block 564, the understeer desired yaw rate, $\gamma_{DU}$, is set equal to $\gamma_D$ if $\gamma_D$ is within $\pm\gamma_{LU}$, equal to $-\gamma_{LU}$ if $\gamma_{DU}$ is less than $-\gamma_{LU}$ and equal to $+\gamma_{LU}$ if $\gamma_D$ is greater than $+\gamma_{LU}$.

Blocks 566 and 568 perform the same filter function on $\gamma_{Du}$ as described above with reference to blocks 536 and 538 (FIG. 10) to determine the filtered understeer desired yaw rate $\gamma_{DUF}$.

After block 568, the subroutine 464 for determining the understeer desired YAW rate is completed.

As an alternative to blocks 450, 452 and 454 (FIG. 4), the desired yaw rate, $\gamma_D$, may be determined according to the following equation:

$$\gamma_D=V_S^*(\delta-K_U^*A_M)/L,$$

where $\delta$ is the steering wheel angle, $A_m$ is the output of the lateral accelerometer, $K_U$ is the understeer coefficient of the vehicle and L is the wheel base of the vehicle. The system designer can alter the understeer coefficient $K_U$ to tune the system response as desired. The bank angle corrections (block 452, FIG. 4) are not required since the lateral accelerometer signal is directly input into the equation.

We claim:

1. In a vehicle with a first operating mode in which all vehicle wheels have substantially no lateral movement on a road surface and a second operating mode in which at least some of the vehicle wheels have lateral movement on the road surface, and with an actuator capable of affecting yaw rate, a vehicle yaw rate control method comprising the steps of:

measuring an actual vehicle yaw rate;

measuring vehicle steering wheel position;

in the second mode of operation, determining a desired yaw rate command linearly responsive to the measured steering wheel position;

wherein the actuator is controlled to minimize a difference between the measured vehicle yaw rate and the desired vehicle yaw rate, also comprising the steps of:

measuring vehicle speed;

responsive to the measured yaw rate and vehicle speed, computing a vehicle lateral acceleration;

measuring a vehicle lateral acceleration;

determining a compensation term responsive to the measured and computed vehicle lateral accelerations; and modifying the desired yaw rate command responsive to the compensation term, wherein road bank angles are compensated for in the desired yaw rate command.

2. In a vehicle with an actuator that is capable of affecting vehicle yaw rate, a yaw rate control method comprising the steps of iteratively:

measuring vehicle speed and steering wheel angle;

determining a present desired yaw rate command responsive to the measured vehicle speed and steering wheel angle;

determining a present oversteer yaw rate command responsive to the present desired yaw rate command and at least one previously determined oversteer yaw rate command; and determining a present understeer yaw rate command responsive to the present yaw desired yaw rate command and at least one previously determined understeer yaw rate command, wherein the present oversteer and understeer yaw rate commands are determined in parallel, both being continuously updated regardless of whether the vehicle is experiencing understeer or oversteer, wherein the actuator is controlled responsive to one of the present oversteer yaw rate command and the present understeer yaw rate command.

* * * * *